(12) United States Patent
Orcutt

(10) Patent No.: US 6,377,958 B1
(45) Date of Patent: Apr. 23, 2002

(54) FILE SYSTEM CONVERSION

(75) Inventor: Niel Orcutt, Pleasant Grove, UT (US)

(73) Assignee: PowerQuest Corporation, Orem, UT (US)

( * ) Notice: Subject to any disclaimer, the term of this patent is extended or adjusted under 35 U.S.C. 154(b) by 0 days.

(21) Appl. No.: 09/612,581

(22) Filed: Jul. 7, 2000

Related U.S. Application Data

(63) Continuation-in-part of application No. 09/115,196, filed on Jul. 15, 1998
(60) Provisional application No. 60/153,448, filed on Sep. 10, 1999.

(51) Int. Cl.[7] .............................................. G06F 12/00
(52) U.S. Cl. ...................................................... 707/200
(58) Field of Search ................................ 707/200–206, 707/100–102, 7; 711/100, 129, 130–132, 173, 208

(56) References Cited

U.S. PATENT DOCUMENTS

| | | | |
|---|---|---|---|
| 5,537,592 A | 7/1996 | King et al. | 395/600 |
| 5,675,769 A | * 10/1997 | Ruff et al. | 711/173 |
| 5,706,472 A | 1/1998 | Ruff et al. | 395/497.04 |
| 5,930,831 A | 7/1999 | Marsh et al. | 711/173 |

OTHER PUBLICATIONS

Custer, Helen, Windows NT File System, Apr. 1997, Microsoft Press, pp. 1–71.*
Custer, *Inside the Windows NT File System* (entire book), 1994.
Automating NTFS Conversion, pp. 1–2, Jan. 19, 1999.
Why Setup Reboots Three Times When Converting to NTFS, Sep. 2, 1999.
Free Space Required to Convert FAT to NTFS, Jan. 22, 1999.
Disk Subsystem, pp. 1–2, no later than Nov. 1, 1999.
Design and Implementation of the Second Extended Filesystem, pp. 1–14, no later than Jul. 6, 2000.
"Unconstrained Filenames on the PC! Introducing Chicago's Protected Mode Fat File System", Walter Oney, *Microsoft Systems Journal*, Aug. 1994, pp. 13–24.
"File–System Development with Stackable Layers", John S. Heidemann et al., *ACM Transactions of Computer Systems*, vol. 12, No. 1, Feb. 1994, pp. 58–59.
"The Logical Disk: A New Approach to Improving File Systems", Wiebren de Jonge et al., 14th ACM Symposium on Operating Systems Principles, 1993, pp. 15–28.

(List continued on next page.)

*Primary Examiner*—Hosain T. Alam
*Assistant Examiner*—Alford W. Kindred
(74) *Attorney, Agent, or Firm*—Computer Law[++]

(57) ABSTRACT

Methods and systems are provided for converting from a complex file system such as a Microsoft NTFS file system or a Linux ext2fs file system, to a simpler FAT file system. Features of the advanced file system are identified and handled. Depending on the circumstances, some features are carried over to the resulting FAT file system, while other features carry over only partially or not at all.

38 Claims, 3 Drawing Sheets

OTHER PUBLICATIONS

"An MS–DOS File System for Unix", Alessandro Forin et al. Sep. 1993, pp. 1–23.

"Semantic File Systems", David K. Gifford et al., 13th ACM Symposium on Operating Systems Principles, 1991, pp. 16–25.

"Design Goals and Implementation of the New High Performance File System", Ray Duncan, *Microsoft Systems Journal*, Sep. 1989, pp. 01–13.

"Vnodes: An Architecture for Multiple File System Types in Sun Unix", S.R. Kleiman, Summer 1986 USENIX Conference, pp. 238–247.

"The Generic File System", R. Rodriquez et al., Summer 1986 USENIX Conference, pp. 260–269.

"GFS Revisited or How I Lived with Four Different Local File Systems", Matt Koehler, pp. 291–305.

PowerQuest Press Release, Oct. 18, 1999.

PowerQuest Press Release, Jul. 9, 1998.

PartitionMagic Convert vs. Windows 98 FAT32 Conversion Utility, Oct. 12, 1998.

"PartionMagic 5.0 Pro", Info PC, Sep. 1999 (with English translation).

PartitionMagic® 5.0 flyer (two pages), prior to Dec. 31, 1999.

\* cited by examiner

FILE SYSTEM CONVERSION

RELATED APPLICATIONS

The present application claims priority to commonly owned copending U.S. patent application Ser. No. 60/153,448 filed Sep. 10, 1999, with inventor Niel Orcutt, which claims priority in turn to commonly owned copending U.S. patent application Ser. No. 09/115,196 filed Jul. 15, 1998, with inventor Niel Orcutt; both of these applications are incorporated by reference herein. The present application claims benefit of No. 60/153,448 Sep. 10, 1999 which is a CIP of Ser. No. 09/115,191 Jul. 15, 1999.

FIELD OF THE INVENTION

The present invention relates to in-place conversion of a computer disk partition's file system without archiving or destroying user data, and more particularly to conversion from an "advanced file system" such as NTFS to a FAT file system.

TECHNICAL BACKGROUND OF THE INVENTION

Storage Media

Computers utilize a wide variety of disks as storage media for user data. Disk technologies currently provide optical disks, magnetic disks, hard disks, floppy disks, and removable disks, and new disk technologies are being actively researched and developed. Indeed, some disks used by computers in the future may be cubical or some other shape rather than flat and circular.

FIG. 1 illustrates a disk 100 attached to a disk drive 102. The disk 100 illustrates physical characteristics of both floppies and hard disks; flash memory, cubical disks or other disks may appear in different configurations than the one shown here. The disk 100 contains a number of concentric data cylinders such as the cylinder 104. The cylinder 104 contains several data sectors, including sectors 106 and 108. The sectors 106 and 108 are located on an upper side 110 of the disk 100; additional sectors may be located on a lower side 112 of the disk 100. The sides 110, 112 of the disk 100 define a platter 114. A hard disk may contain several platters. The upper side 110 of the disk 100 is accessed by a head 116 mounted on an arm 118 secured to the drive 102. Optical or cubical disks may be accessed by other means, such as photoemitters or photoreceptors, and flash memory or other memory disks are accessed by electronic circuits familiar to those of skill in the art.

A given sector on the disk 100 may be identified by specifying a head, a cylinder, and a sector within the cylinder. A triplet specifying the head number, cylinder number, and sector number in this manner is known as a "physical sector address." Alternatively, a given sector may be identified by a logical sector address, which is a single number rather than a triplet of numbers.

Partitions and File Systems

Many disks mold the available space into one or more partitions by using a partition table located on the disk. A wide variety of partitions are used, and more partition types will no doubt be defined over time. Many partitions reside on a single disk, but some use volume sets, stripe sets, mirror sets, or other approaches to store a single partition's data on more than one disk. A partial-list of current partitions and their associated file systems is given below; the trademarks listed are the property of their respective owners. This list includes a variety of 12-bit, 16-bit, and 32-bit FAT file systems and numerous other file systems. The list illustrates the benefit of being able to at least identify a variety of partitions to determine what conversion operations, if any, are both pertinent and supported; it does not follow that each and every partition listed should or must be supported in a commercial product or in an embodiment of the invention described and claimed hereafter:

12-bit FAT
16-bit FAT>=32 MB, Ext INT 13
16-bit FAT, partition<32 MB
16-bit FAT, partition>=32 MB
32-bit FAT
32-bit FAT, Ext INT 13
Advanced UNIX
AIX (Linux)
AIX Bootable (Linux)
AIX bootable partition
AIX data partition
Amoeba bad block table
Amoeba file system
AST Windows swap file
BSDI file system or secondary swap
BSDI swap partition or secondary file system
Coherent file system
Coherent swap partition
Commodore DOS
Compaq diagnostics
Concurrent CP/M, Concurrent DOS
CP/M
CP/M 86
CTOS (Convergent Technologies OS)
Cyrnix
Dell partition spannning multiple drives (array)
Disabled NT FAT volume set (Q114841)
Disabled NT IFS volume set (Q114841) (HPFS)
Disk.Secure Multi-Boot
DOS 3.3+second partition
DOS access (Linux)
DR-DOS 6.0 LOGIN.EXE-secured 12-bit FAT partition
DR-DOS 6.0 LOGIN.EXE-secured 16-bit FAT partition
DR-DOS 6.0 LOGIN.EXE-secured Huge partition
Extended partition or Extended volume
Extended partition, Ext INT 13
EZ-Drive 3.05
FreeBSD/386
GNU HURD
GoldenBow VFeature
Hidden 12-bit FAT
Hidden 16-bit FAT>=32 MB, Ext INT 13
Hidden 16-bit FAT, partition<32 MB
Hidden 16-bit FAT, partition>=32 MB
Hidden 32-bit FAT
Hidden 32-bit FAT, Ext INT 13
Hidden IFS
Installable file system: HPFS, NTFS
LANstep
Linux native file system (ext2fs/xiafs)
Linux Swap partition Linux/Minix v1.4b+
Mach, MtXinu BSD 4.3 on Mach
Microport System V/386
Minix v1.1–1.4a
Mitac Advanced Disk Manager
Mylex DCE376 EISA SCSI controller, past 1024th cyl
NEC MS-DOS 3.x
NextStep Partition
Novell Netware
Novell Netware (3.11 and 4.1)
Novell Netware 286
Novell Netware 386
NT FAT volume set (Q114841)
NT IFS volume set (Q114841) (HPFS)
Old MINIX (Linux)
Ontrack Disk Manager 6.0 (DDO)
Ontrack Disk Manager, read/write
Ontrack Disk Manager, read-only
Ontrack Disk Manager, write-only
OPUS
OS/2
OS/2 Boot Manager
OS/2 hiding type 04h partition
PC/IX
Personal RISC Boot
Priam EDISK
Prime
QNX
Save to Disk Partition
Secure File System
SpeedStor
SpeedStor 12-bit FAT extended partition
SpeedStor 16-bit FAT extended partition
SpeedStor Dimensions
SpeedStor Storage Dimensions
SplitDrive
Syrinx
UNIX SysV/386, 386/ix
VENIX 80286
XENIX /usr file system
Xenix bad-block table
XENIX root file system A file system of particular interest here is the NT File System ("NTFS"). Discussions of NTFS are provided in "Inside the Windows NT File System", by Helen Custer, ISBN 1-55615-660-X, as well as in marketing and technical materials available in hard copy and on the Internet from Microsoft Corporation and other sources. Those of skill in the art will note that these discussions sometimes involve unimplemented specifications or mere speculations.

NTFS contains advanced file system features which make it more complex or difficult to manipulate NTFS partitions than it is to manipulate partitions organized by many existing FAT file systems. More precisely, NTFS combines features such as the use of a database paradigm to support indexing of file attributes; multiple data streams per file; blurring of the distinction between system and user areas; recoverability by use of a log; recoverability by use of transactions; support for large disks; security descriptors constraining access to file objects; Unicode names; support for POSIX features such as links; bad cluster remapping; caching support; virtual memory support; system structure compression; balanced tree directory structures; support for volume spanning, volume sets, stripe sets, mirror sets, and other features which divide a file system's contents between disks or partitions; and/or a relocatable system area. "Attributes" are also known as "data streams"; some advanced file systems allow a single file to hold multiple data streams.

One partition table composition, denoted herein as the "IBM-compatible" partition table, is found on the disks used in many IBM® personal computers and IBM-compatible computers (IBM is a registered trademark of International Business Machines Corporation). In recent years, IBM-compatible computers are sometimes referred to PC-compatible, as computers having an Intel architecture, or even as "Wintel" computers. The term "IBM-compatible" refers nominally to IBM, which was the original source of such computers. However, the items of interest for understanding the present invention are not so much the computer vendor, the processor architecture, or the operating system involved, as they are the partition table and the file systems involved. References to IBM-compatible partition tables herein should be understood accordingly. IBM-compatible partition tables may be used on a wide variety of disks, with a variety of partition and file system types, in a variety of ways. In particular, the partition table format may be changed without necessarily changing file system formats, and vice versa.

As shown in FIG. 2, one version of an IBM-compatible partition table 200 includes an Initial Program Loader ("IPL") identifier 202, four primary partition identifiers 204, and a boot identifier 206. As shown in FIG. 3, each partition identifier 204 includes a boot indicator 300 to indicate whether the partition in question is bootable. At most one of the partitions in the set of partitions defined by the partition table 200 is bootable at any given time but "boot management" tools are commercially available to facilitate booting from different partitions.

Each partition identifier 204 also includes a starting address 302, which is the physical sector address of the first sector in the partition in question, and an ending address 304, which is the physical sector address of the last sector in the partition. A sector count 306 holds the total number of disk sectors in the partition. A boot sector address 308 holds the logical sector address corresponding to the physical starting address 302. Additional partition information may be stored in a disk administrator utility or other location outside the partition table, or in an enhanced partition table, particularly when partitions are allowed to span disks.

Many IBM-compatible computer systems allow "logical partitions" as well as the primary partitions just described. All logical partitions are contained within one primary partition; a primary partition which contains logical partitions is also known as an "extended partition."

Each partition identifier 204 also includes a system indicator 310. The system indicator 310 identifies the type of file system contained in the partition, which in turn defines the physical arrangement of data that is stored in the partition on the disk 100 (FIG. 1). For instance, the system indicator may indicate that data is organized in the partition according to some version of NTFS, with multiple data streams, a relocatable system area, and/or other features noted above. System indicator values not recognized by a particular operating system are treated as designating an unknown file system.

The file system associated with a specific partition of the disk 100 determines the format in which data is stored in the partition, namely, the physical arrangement of user data and of file system structures in the portion of the disk 100 that is delimited by the starting address 302 and the ending address 304 of the partition in question.

An operating system manages access, not only to the disk 100, but to other computer resources as well. Resources typically managed by the operating system include one or more disks and disk drives, memory (RAM and/or ROM), micro-processors, and I/O devices such as a keyboard, mouse, screen, printer, tape drive, modem, serial port, parallel port, or network port.

File System Conversion

It is sometimes desirable to alter the contents of a partition in-place without copying all necessary user and system data off the disk to a temporary storage location such as a tape or another disk and using FDISK or a similar tool. Inventions for in-place partition manipulation without destroying user data are described in U.S. Pat. Nos. 5,675,769, 5,706,472, and 5,930,831, and in U.S. patent application Ser. No. 08/932,530. Software embodying such inventions is commercially available from PowerQuest Corporation of Orem, Utah. However, these patent documents do not teach comprehensive methods for converting in-place from an advanced file system such as NTFS, to a simpler file system such as one of the various FAT file systems.

Microsoft Windows 95b and Windows 98 products apparently include functionality to convert a FAT-16 partition to a FAT-32 partition in-place and without requiring an auxiliary storage medium or destroying user data. Likewise, Microsoft's Windows NT product apparently includes functionality to convert a FAT-16 partition to an NTFS partition in-place and without requiring an auxiliary storage medium or destroying user data, and Microsoft's Windows 2000 product apparently includes functionality to convert a FAT-16 or a FAT-32 partition to an NTFS partition in-place and without requiring an auxiliary storage medium or destroying user data. Microsoft provides a CONVERT utility to perform these file system conversions.

Because the NTFS device driver is so complex and because the software used to install Microsoft Windows NT does not manage large amounts of memory, Windows NT cannot be installed onto an NTFS partition directly. When a user selects installation onto an NTFS partition, the install program creates a FAT partition and installs Windows NT to it. It then uses NT's boot-time program launcher to run the CONVERT program from within Windows NT. This program converts the FAT partition to an NTFS partition. In addition, sophisticated users can run Windows NT's CONVERT utility directly to produce NTFS partitions from FAT partitions.

Technology is also apparently known for converting FAT-16 to HPFS (High Performance File System). Technology may possibly be known for converting FAT-16 or HPFS to IBM's AFS format.

However, the aforementioned patents and other items do not enable satisfactory methods for converting NTFS partitions into FAT partitions. They do not adequately teach tools and techniques for preserving user data while modifying or creating FAT system data from the NTFS system data previously employed within the partition, and doing so without requiring use of an alternate storage medium. They do not permit file system conversion of commonly encountered NTFS file system instances from NTFS to FAT without necessarily backing up the data from the NTFS partition, reformatting the NTFS partition to create a new empty FAT partition, and then restoring the data to the new FAT partition.

Microsoft's conversion technology apparently checks for available space, builds system structures in free space of the existing file system, and then effects conversion by switching boot records. It apparently does not vacate space by moving clusters to make room for the new file system's structures if that is necessary. Moreover, it is apparently a one-way road, in the sense that while it converts between FAT file systems, or from a FAT file system to a more complex NTFS file system, it cannot convert an NTFS file system back to FAT.

A conventional approach using XCOPY or another data copy utility is also unsatisfactory. Such an approach requires copying all desired user data (that is, all of the data one wishes to find in the resulting FAT partition) from the NTFS partition to a designated FAT partition elsewhere on the computer's disk subsystem or on a tape, for instance, and then deleting the source NTFS partition. This copy operation can be very time consuming, and it requires enough free space to hold a duplicate of the user data.

Conversion from a simpler file system, such as a FAT file system, to a more complex or advanced file system, such as NTFS or HPFS or AFS, is relatively straight-forward because one starts with source file system whose features are a subset or special case of the target file system's features. By contrast, converting from a more advanced file system to a simpler file system—and doing so in-place, safely, and efficiently—requires new tools and techniques.

Thus, it would be an advancement in the art to provide improved tools and techniques for file system conversion, such as systems and methods for converting NTFS partitions to FAT format in-place without destroying user data.

Such tools and techniques are disclosed and claimed herein.

BRIEF SUMMARY OF THE INVENTION

The present invention provides methods, articles, and systems for safely and efficiently converting advanced file systems in-place to simpler file systems. In particular, and without limitation, the invention can be used to convert NTFS partitions or Linux ext2fs to FAT partitions with little or no user data movement and without a substantial risk of unintentionally losing user data.

One inventive method for converting an advanced file system to a simpler file system in-place while preserving user data comprises checking for sufficient space to hold file system structures of the simpler file system; creating file system structures of the simpler file system using data values from file system structures of the advanced file system; and updating file system identification information to identify the simpler file system to an operating system rather than identifying the advanced file system to the operating system.

In some situations, the creating step creates file system structures of the simpler file system in part of a partitionable storage medium that is treated by the advanced file system as free space, while in others the advanced file system structures are partially or entirely overwritten. In some cases, the method further comprises vacating space, and the creating step creates file system structures of the simpler file system at least partially in such vacated space.

The method, or other inventive embodiments such as configured CDs or systems, may delete one or more advanced file system features, with or without user permission or notice, such that the simpler file system produced by the method lacks a feature corresponding to the deleted feature. Thus, features such as the following may be deleted: NTFS indexes, NTFS named data streams, NTFS prior file versions, file access control lists, file storage quotas, symbolic links, and other features.

In addition to deleting certain features in a given situation, the invention creates a simpler (FAT) file system which includes features corresponding to the NTFS or other advanced file system. For instance, if the advanced file system includes a file that has a short file name and lacks a long file name, the invention may create a FAT long file name corresponding to the short file name. Likewise, if the advanced file system includes a first volume label that contains more than eleven characters, the invention may create from the first volume label a FAT volume label of no more than eleven characters.

User data in files is generally carried over during conversion so that it appears in the FAT file system unless the user expressly deletes it or authorizes deletion. However, user data in additional versions of a file or in additional data streams of a file may be deleted by default in some embodiments of the invention.

The invention is not limited to situations in which conversion to a FAT file system is completed. The invention also includes systems, configured media, and methods for attempting conversion of an advanced file system to a simpler file system. For instance, some inventive methods comprise checking for at least one preventive condition in the advanced file system that prevents an implementing program from completing a file system conversion from the advanced file system to the simpler file system; discontinuing an attempted file system conversion by the implementing program without completing the file system conversion if such a preventive condition is found; and completing the file system conversion if no such preventive condition is found. Completing the conversion comprises creating file system structures of the simpler file system using data values from file system structures of the advanced file system and updating file system identification information to identify the simpler file system to an operating system rather than identifying the advanced file system to the operating system.

The condition checking step checks for one or more of the following preventive conditions: a lack of sufficient space to hold file system structures of the simpler file system; files compressed by a file system driver; sparse files; a file with more than one short name and one long name, both in the same directory; clusters which are at least sixty-four kilobytes in size; a file which is larger than four gigabytes in size; a bad cluster at a location that would be used by a file system structure of the simpler file system.

Inventive systems include at least one computer having a processor in operable connection with a memory, and a partitionable storage medium having at least one partition. The partition is identified by file system identification information such as a partition table system indicator. The partition contains an advanced file system which is accessible for manipulation by use of the processor. The system is configured to perform a method to at least attempt conversion of an advanced file system to a simpler file system: checking for at least one preventive condition in the advanced file system that prevents completion of a file system conversion from the advanced file system to the simpler file system; discontinuing an attempted file system conversion without completing it if such a preventive condition is found; and completing the file system conversion if no such preventive condition is found.

Other system embodiments include at least two computers, each having at least a memory, a processor, and I/O devices. The computers are connected by a network for communication. The system includes a means for deleting at least one predetermined advanced file system feature from a selected partition on one of the computers without user feedback, and a means for deleting at least one other predetermined advanced file system feature from the selected partition after user feedback agreeing to the deletion.

The invention permits users to restore FAT file systems that have been converted to NTFS or another advanced file system, without backing up all data to tape or another drive and then reformatting the partition. Leaving the user data mostly or entirely in place makes the conversion faster and more efficient. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention provides methods, articles, and systems for safely and efficiently converting advanced file systems in-place to simpler file systems. In particular, and without limitation, the invention can be used to convert NTFS partitions to FAT partitions with little data copying and without a substantial risk of losing user data. Unless otherwise indicated, "FAT" includes FAT-12, FAT-16, FAT-32 and other partitions which use a file allocation table to allocate clusters of disk sectors.

Definitions

As used herein, "file system conversion" is shorthand for a phrase such as "conversion of the storage format of data in an instance of a file system-which is stored in one or more partitions." That is, file system conversion is primarily concerned with the storage format of data within one or more partitions, rather than the storage format of a partition within one or more disks. File systems and partitions are often, though not always, in one-to-one correspondence. A file system often resides in a single partition, but may also span partitions. For instance, volume sets, stripe sets, or other approaches may coordinate file system elements in more than one partition to present the user with an interface to a single file system. Likewise, a partition often contains a file system, but need not do so. For instance, a partition may be empty, or it may contain a stream or block of raw data without any directories, file allocation tables, bitmaps, or similar file system structures. The file system being converted may reside in a volume. The volume may include one or more partitions on one or more disks. An "NTFS partition" or "NT file system partition" is thus a partition in a volume containing an NTFS file system.

One might argue there is no converted partition until the partition table 200 is updated, even if all the disk sectors that will lie in the converted partition have been updated to contain appropriate file system structures and user data, because partitions are defined by entries in the partition table 200. However, for convenience the term "converted partition" means "intended or actual converted partition(s)." That is, "converted partition" is used to denote both the partition (or partitions if the file system spans partitions) produced from the selected partition(s) and the collection of disk sectors which the converted partition(s) are meant to occupy. Accordingly, one may speak of converted partitions, based on identified selected partitions and one or more identified operations to be performed on the selected partition(s), even before the partition table 200 is updated.

Overview of Inventive Methods

Figure 4:
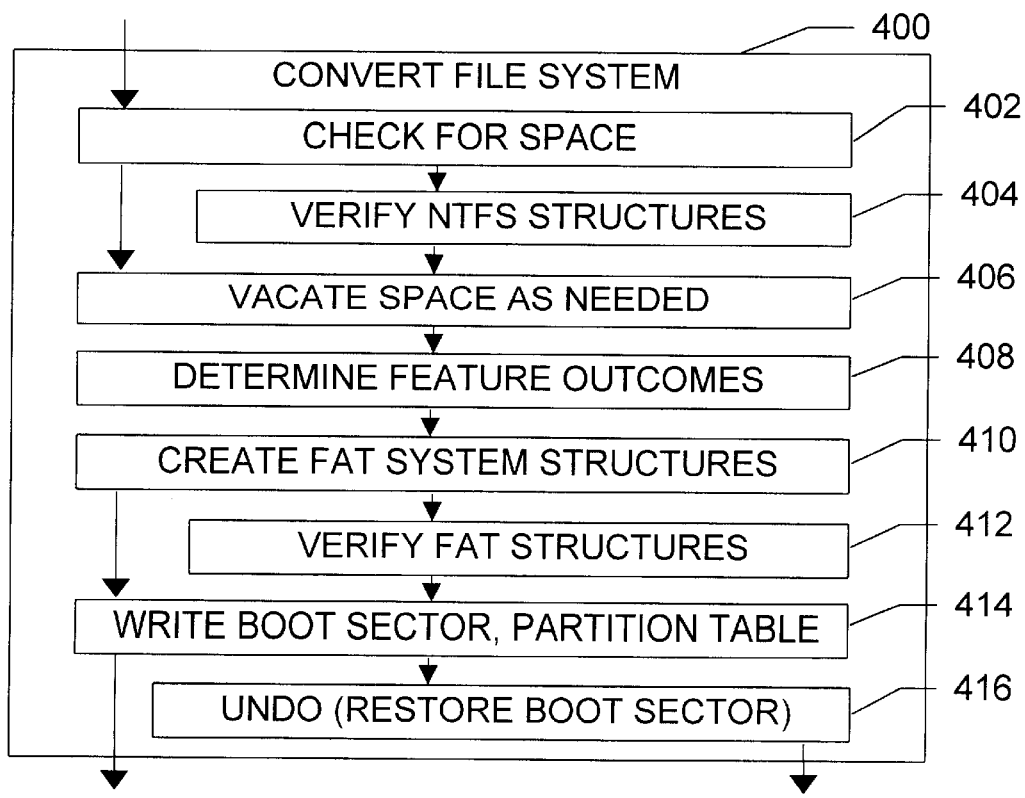
FIG. 4 is a flowchart illustrating file system conversion methods of the present invention.

FIG. 4 illustrates methods of the present invention, but the present discussion is not limited to methods. Those of skill will appreciate that the inventive methods may also be used in configured storage media and/or computer system implementations according to the invention. To prevent unnecessary repetition, the discussion of methods thus applies to articles and systems, and vice versa, unless indicated otherwise.

Figure 6:
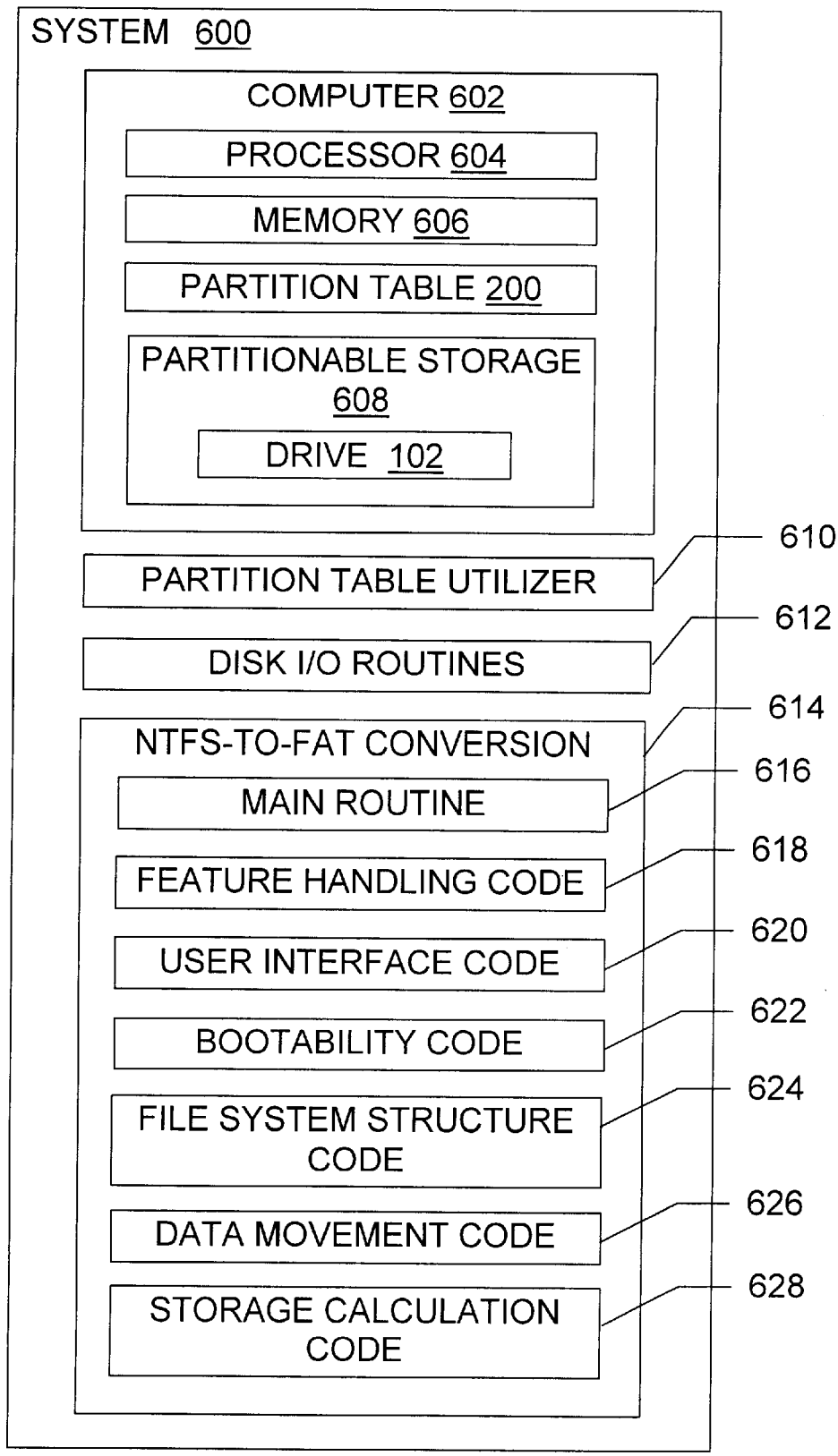
FIG. 6 is a diagram illustrating a system which implements the present invention.

Initially, an overview of the methods illustrated in FIG. 4 is provided, followed by an overview of systems illustrated in FIG. 6. Variations and details are provided elsewhere in this description. Not every variation is enumerated. For instance, those of skill will appreciate that the steps illustrated may be grouped differently, performed in different orders (including overlapping performance), an omitted, except to the extent that the result of a step is called for at a particular point in the process.

Methods of the invention include a file system conversion step 400 for converting from an advanced file system to a simpler file system. For instance, the invention provides tools and techniques for converting from an NTFS or Linux ext2 file system to a FAT file system, such as FAT-32, FAT-16, or FAT-12.

In some implementations, the conversion proceeds directly from the advanced file system to the desired simpler system. In others, two conversions are performed, such as a conversion from NTFS to FAT-32, followed by a conversion from that FAT-32 file system to a FAT-16 file system. To promote brevity and clarity, however, the discussion focuses on the conversion from NTFS to some FAT file system in a selected partition, regardless of whether another conversion will then be performed on that FAT file system.

A space checking step 402 precalculates the total free space needed to store all of the FAT directories and other file system structures being created, and checks the selected partition to make sure it has at least that much free space. The FAT file system structures will be stored on disk in space that is treated by the NTFS file system as free space. In some cases, it may be necessary for the user or an implementing program to delete files and/or increase the partition size to provide adequate space before the file system conversion can proceed. In general, if the partition does not have sufficient free space, this constitutes a "preventive condition" so the program informs the user, cleans up, and exits.

An optional but generally recommended NTFS integrity verifying step 404 checks the integrity of NTFS file system structures in the selected partition. If errors are found, a preventive condition is present, so no conversion is performed. The tests made during step 404 may be tests of the type performed by CHKDSK, ScanDisk, and/or similar consistency check programs. The verifying step 404 preferably checks the internal consistency of all redundant copies of system information, in addition to checking the integrity of the system in other ways.

A vacating step 406 checks for files whose data is stored in the region that will hold the file allocation tables and boot record at the beginning of the converted partition. In an embodiment that performs the vacating step during or prior to the space checking step 402, if any files are found in the locations that will be used by the FAT system structures, then the vacating step adds the space needed to move the user data to the total free space requirement determined by the space checking step 402. In other embodiments, the vacating step tries to locate sufficient free space outside the sectors that will be used by the NTFS and FAT system structures, and conversion is not completed if such space is not found. In any case, the vacating step 406 moves file data out of the way as needed to make room for the FAT system structures. In one embodiment, all of each such file of data is moved. In another embodiment, only those data clusters within a file that need to be moved are moved; the other clusters of the file are left in place.

A feature determining step 408 determines how to map NTFS or other advanced file system features to FAT file system features. The step 408 identifies pertinent features present in the file system instance being converted, and determines how to handle them. This may involve deleting features, with or without interactively obtaining user permission and with or without interactively notifying the user, depending on the implementation and other circumstances. It may also include identifying one or more preventive conditions that prevent completion of the attempted conversion.

Different implementations may handle the same advanced file system feature in different ways. NTFS or other advanced file system features that correspond to FAT features may be implicitly identified. For instance, the content of an unnamed sole data stream in an NTFS file corresponds to the content of a FAT file. Likewise, NTFS files that lack access control lists correspond to FAT files, all of which lack access control lists. The feature determining step 408 is shown separately for clarity of illustration, but feature handling determinations may be made at various points, and such determinations may be implicit or express.

A file system structure creating step 410 creates file system structures for the simpler file system, based on the data values in the advanced file system structures and the feature determinations. For instance, FAT file allocation tables and a FAT root directory may be created from NTFS file system structures. The file system structures of the converted (e.g., FAT) partition may be created in volatile memory and then written to disk in one or more writes of entire system structures, or they may be written in pieces as data values are processed.

The converted file system's structures are preferably written in space currently treated by the selected partition's file system as free. However, an alternate embodiment overwrites FAT structures on top of NTFS structures, despite the risk that interruption of the overwriting process can lead to internally inconsistent file system structures in the partition. This permits conversion to proceed when less free space is available than would otherwise be required. A backup copy of the original file system structures can be kept on another storage medium and/or in another partition.

An optional but generally recommended FAT integrity verifying step 412 checks the integrity of FAT or other file system structures in the converted partition. If errors are found, conversion is not completed; thus, the original NTFS file system structures continue to be used. The tests made during step 412 may be tests of the type performed by CHKDSK and similar consistency check programs.

During an updating step 414, the boot sector is updated. In particular, the partition table 200 is updated to make the system indicator 310 indicate the type of FAT file system created, rather than indicating an NTFS system. This completes the conversion, since it causes the operating system to treat the converted partition as a FAT partition, rather than an NTFS or ext2 partition, after the computer is rebooted. Allocated RAM is also released during or prior to step 414, and any other clean-up steps are taken as needed, according to generally familiar programming techniques.

One advantage of using an approach by which system structures defining both file systems (NTFS and FAT) are simultaneously present is the ease with which the conversion can be reversed. Until the point in time at which space treated as free in the FAT system but containing NTFS system data is actually overwritten, the conversion from NTFS to FAT can be reversed by simply restoring 416 the NTFS boot sector.

Overview of Inventive Systems

The tools and techniques described here can be applied to standalone computers and/or to networked computers, such as those connected to a LAN, WAN, or the Internet. "Internet" as used herein includes variations such as a private Internet, a secure Internet, a value-added network, a virtual private network, or an intranet. The computers connected by the network may be clients, servers, peers, or a combination thereof. Suitable network clients include, without limitation, personal computers, laptops, workstations, and dumb terminals. The signal lines used in the network may include twisted pair, coaxial, or optical fiber cables, telephone lines, satellites, microwave relays, modulated AC power lines, and other data transmission "wires" known to those of skill in the art. Signals according to the invention may be embodied in such "wires" and/or in addressable storage media.

Figure 1:
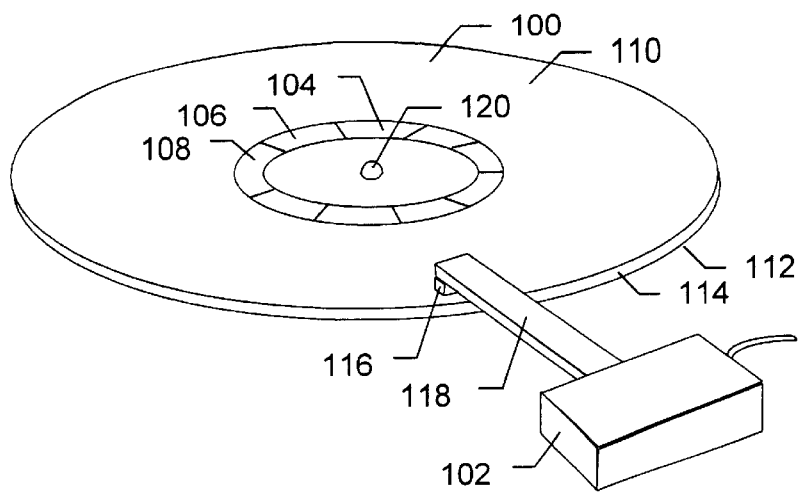
FIG. 1 is a partial cut-away view of a computer disk.
Figures 2, 3:
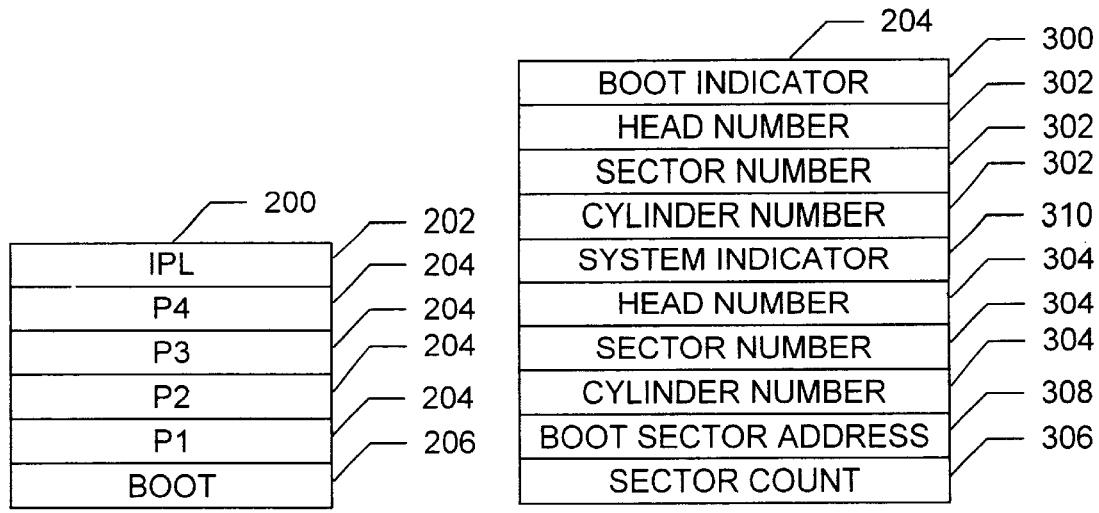
FIG. 2 is a diagram illustrating an IBM-compatible partition table.
FIG. 3 is a diagram further illustrating a portion of the partition table shown in FIG. 2.

One embodiment of the present invention manipulates NTFS partitions on a computer using a system such as the system 600 shown in FIG. 6. The system 600 includes at least one computer 602 which has a processor 604 for executing program instructions, a memory 606 for storing program instructions and data, and a partitionable storage medium 608 for holding data in sectors according to the partition table 200 (FIG. 2). The partitionable storage medium 608 includes one or more non-volatile storage devices such as magnetic or optical disk drives 102. The memory 606 and the partitionable storage medium 608 can be written and read by execution of appropriate processor 604 instructions, direct memory access, or other familiar means.

The illustrated embodiment includes one computer 602 but the methods of the present invention may be initiated, controlled, and/or monitored remotely from another computer, such as a server connected to the first computer 602 by a network, modem, or other familiar means. The computer 602 may itself be a server connected by network signal lines to one or more network clients, or it may be a network client, or it may be a standalone machine. A server computer 602 may be configured as an Internet server, as an intranet server, as a name server, as a file server, as an applications server, or as a combination thereof. A given computer 602 may also function both as a client and as a server; this may occur, for instance, on computers 602 running Microsoft Windows NT software (WINDOWS NT is a mark of Microsoft Corporation). The processor 604 may be a uniprocessor or a multiprocessor. Suitable computers 602 include, without limitation, personal computers, laptops, and workstations. Although particular computer system 600 components are identified herein, those of skill in the art will appreciate that the present invention also works with a variety of other systems 600.

The system 600 also includes a partition table utilizer 610 which is capable of extracting from the partition table 200 information such as partition boundaries, partition sizes, partition types, and whether a partition is bootable. The partition table utilizer 610 is also capable of modifying the partition table 200 to reflect changes in such information (once the changes are specified to the utilizer 610), and of performing the modifications is subject to locks and/or semantic constraints to maintain the integrity and self-consistency of the data stored in the partition table 200.

The partition table utilizer 610 may be embodied in software which runs on the computer 602 and which reflects the semantic constraints imposed on partitions. Perhaps the simplest such constraint is that no sector belongs to two primary partitions or to two logical partitions. Other semantic constraints on partitions are also well-known. The partition table 200 and an executable copy of the partition table utilizer 610 may be stored on one of the disk drives 102 in the partitionable storage 608, but are shown separately for clarity of illustration.

A set of disk input/output routines 612 is used by the partition table utilizer 610 and other components of the system 600 to access user and system data on the drive 102. Suitable routines are well-known to those of skill in the art, regardless of their familiarity with NTFS, at least with respect to simple sector I/O. More sophisticated routines 612 provide NTFS volume bitmap and Master File Table bitmap access, status information such as whether a reboot is needed to update operating system structures or gain a lock, interfaces with operating system locks to provide exclusive access to disk contents, access to boot sectors and backup boot sectors, access to bad sector lists, management of NTFS File Record Segments, directory operations such as list or create or delete, access to file and cluster size information, access to volume flags and logical cluster number information, and similar information. Such routines may be implemented using software and hardware familiar to those of skill in the art, with particular reference to the documented structure and operation of NTFS and its associated operating systems in view of the teachings of the present invention.

One or more selected partitions in the storage medium 608 may be converted to produce corresponding converted partition(s). During such operations it is sometimes necessary to move data from one location to another in the medium 608 and to update NTFS system structures accordingly. Such operations preferably move the data and file system structures as little as necessary. They also preferably always keep at least one copy of user data and system information stored on disk, in case the partition conversion is interrupted by an event that requires rebooting.

A file system conversion module 614, such as an NTFS-to-FAT module or an ext2-to-FAT module, manipulates system and user data in place in a selected partition to produce a corresponding converted partition, taking into account special characteristics and requirements of the NTFS or other advanced file system used in the partition. Software which embodies part or all of the module 614 may be loaded for execution from a drive 102 on the computer 602 that holds the selected partition, or the software may be loaded over a network or other connection from a file server or some other computer 602. The conversion module 614 is described in detail elsewhere herein.

Additional Details

Methods

Figure 5:
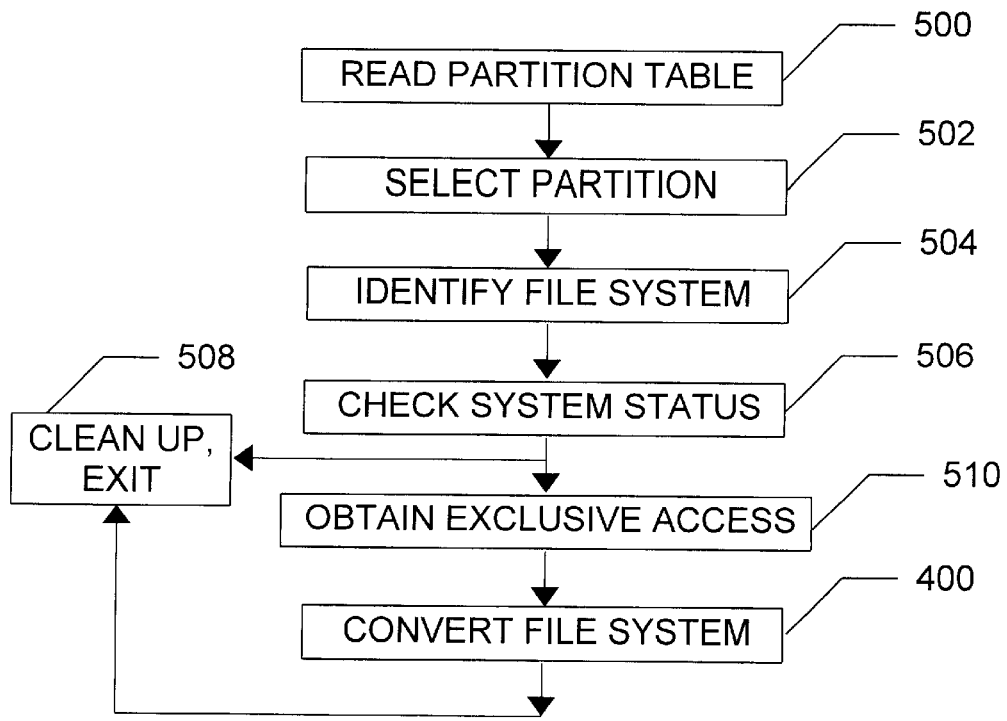
FIG. 5 is a flowchart further illustrating methods of the present invention.

FIG. 5 further illustrates the context of the file system conversion step 400. During a partition table reading step 500, the partition table utilizer 610 reads the partition table 200 from the storage medium 608 into a memory structure, such as a C or C++ struct, a Pascal record, or the like.

During a selecting step 502, a partition is selected. This may be performed automatically by software driving the conversion module 614, or it may be done interactively by a human user using an interface 620 such as a graphical user interface (GUI). The present invention focuses on conversion of logical or primary NTFS partitions, since conversion has little relevance to extended partitions.

During an identifying step 504, the file system being used in the selected partition is identified by checking the system indicator 310. The system indicator may identify an advanced file system such as NTFS or ext2. However the step 504 may also identify a proprietary or in-progress partition which indicates that partition conversion was interrupted, such as a recovery partition indicator. If a recovery partition indicator is present, recovery proceeds by backing out all changes, by continuing the conversion from the last logged checkpoint, or by creating a new set of FAT file system structures without regard to work that may have been done on previously creating such structures in this partition. For ease of illustration, we concentrate on the case in which the file system identified during the step 504 is an NTFS file system.

During a checking step 506, the file system status is checked to determine whether the system 600 is in a known state, that is, a state in which necessary assumptions about file system structures hold true. Presence of a recovery partition indicator does not necessarily indicate an unknown state; the state may be unknown to conventional operating system or file system software but known to an embodiment of the present invention. In NTFS, the system 600 is presumed to be in an unknown state if a volume's "dirty bit" is set. The dirty bit may be set, for instance, if power to the computer 602 is shut off before the file and operating systems have shut down, or if a disk I/O operation is interrupted.

It may be possible to move the system 600 into a known state by rolling back operations logged in a log file by a transactional file system, using ChkDsk, or other means. However, it is presently preferred that partition conversion software according to the invention simply clean up and exit during a step 508 if the system 600 is in an unknown state, and that the NTFS log file be treated as if it were a user data file. In particular, one embodiment of the invention does not attempt to update, flush, or otherwise modify the log file contents, since they are reinitialized each time the file system software successfully exits and restarts.

Cleaning up involves releasing temporarily allocated memory or disk space, replacing any recovery partition indicator with a conventional value, and otherwise placing the partition in a condition that avoids unnecessary and unpleasant surprises to ChkDsk or to the user.

During a step 510, software embodying the invention gains exclusive access to the partitionable storage medium 608, or at a minimum to the part of that medium that holds (or will hold) the selected partition and the converted partition. For instance, NTFS caching and virtual memory must be disabled, or at least restricted, to prevent any inconsistency between sector locations that are indicated in the memory 606 and the actual location of the sectors on the drive 102. This could be accomplished by flushing and then disabling the cache. In one embodiment, exclusive access is obtained by performing critical disk operations under the DOS operating system instead of under the Windows NT operating system. In another embodiment, exclusive access is obtained by running partition conversion software before the boot process initializes virtual memory and caching subsystems of the system 600.

Conversion Module Main Routine

The illustrated conversion module 614 illustrates aspects of the invention in the specific context of the illustrated system 600 and conversion from NTFS to FAT. It employs the disk I/O routines 612 and the partition table utilizer 610 in a manner understood by those in the art in view of the present description.

A main routine 616 coordinates various pieces of code 618 through 628 in the manner described here, to perform steps such as those illustrated in FIG. 4. Although the pieces of code 618 through 628 are shown separately for clarity of illustration, those of skill will appreciate that a given implementation may provide the necessary functionality through methods, objects, functions, procedures, data structures, in-line code, assembly code or other code, threads, processes, and/or other computer means. In particular, a given implementation may rename or regroup pieces of code shown in FIG. 6, to the extent that doing so does not prevent operation according to the claim(s) in question. During conversion, code does not necessarily execute in the order in which code components appear in FIG. 6; operation of the code should be understood in view of the other Figures as well.

One conversion main routine 616 uses a RUN_REMAP class in a manner described below to convert NTFS partitions to FAT partitions. In addition to the capabilities discussed below, various embodiments include code for updating progress bars in a graphical user interface, code for verifying that a valid NTFS partition is present, and/or code for detecting various conditions such as low memory, a partition with less than about 2 Megabytes of free space (needed by one implementation to permit effective manipulation), bad clusters, cancellation by the user midway through a set of manipulations, and out-of-range values in file record segments or other errors of the type noted by CHKDSK and similar consistency check programs.

In one embodiment, the main routine takes as its only parameter a pointer to an object containing information about the partition such as the partition's location, type (extended, logical, primary), and file system type (NTFS, FAT32, and so on; NTFS is of particular interest here). Internal data local to the routine include variables to receive return codes (OK, low memory, and so on); a pointer to an object containing information about the volume holding the partition; an NTFS file record segment; an NTFS attribute (data stream); a copy of the first four Master File Table records; and attribute header; a pointer to a list of attribute records; a pointer to a run to remap; a pointer to a RUN_REMAP class object; a pointer to a cluster allocation bitmap; a virtual cluster number specifying current position in an attribute; logical cluster numbers specifying the first cluster in a run, the middle cluster in the partition, the first cluster after the Master File Table, the cluster one-eighth into the partition, the first cluster in the Master File Table bitmap, and the first cluster in the Master File Table; integers specifying the current file in the Master File Table, current attribute list entry number, and attribute sequence number, and a Boolean bNew indicating whether this is the first time an attribute has been opened by this invocation of the main routine to have its runs remapped.

One NTFS main routine starts by allocating and initializing for access an object containing information about the volume holding the partition, and allocating a RUN_REMAP object. The routine then obtains a copy of the NTFS volume bitmap and adds bad sectors to the forbidden region.

The RUN_REMAP object is initialized. In particular, the free cluster count is set by SetFreeClusts(1024) and the delta is set by SetDelta(64); other values may be used in other implementations. The Master File Table bitmap is located, and the logical cluster numbers marking the start of the first cluster after the Master File Table and the cluster one-eighth of the way into the partition are determined and recorded by calling SetFirstFree( ) and SetStart( ). If the one-eighth position is less than the first free cluster, then the first free cluster position is used instead of the one-eighth position.

In general, the main routine proceeds according to the steps in FIG. 4, although steps may be grouped differently and/or performed in different orders in different implementations. One implementation begins by checking both free space and NTFS integrity in a step combining steps 402, 404. It then performs step 406, vacating the region that will hold the FAT system structures. Next, the module builds 410 FAT structures in the NTFS free space. In this implementation, the feature determining step 408 is implicit in some regards and explicit in others, in that predetermined features are deleted without user feedback (short file names with lowercase characters, volume labels longer than 11 characters), certain predetermined features are deleted if the user agrees (e.g., multiple file versions, multiple data streams per file, ACLs), and certain predetermined features prevent conversion if present in the NTFS file system instance (e.g., sparse files). Finally, the module creates and writes a FAT32 boot sector during step 414.

Note that in this implementation, the vacating 406 of the beginning of the file system is done entirely before any structure conversion 410 is begun. After the vacating is done, the source file system is intact; aborting the operation 400 after the vacate results in a completely usable source file system.

Conversion Module Feature-Handling Code

A piece of feature-handling code 618 determines if the file system being converted contains any NTFS features that could prevent conversion to FAT. In some embodiments, conversion proceeds if the user gives permission for specified features to be deleted. In other embodiments, the implementing program simply notes the presence of any NTFS feature which has no corresponding equivalent in FAT, notifies the user, and terminates without performing the conversion. In some cases, NTFS features with no equivalent in FAT are deleted without seeking user permission, to allow conversion to proceed.

For instance, one embodiment deletes the following advanced features of NTFS may deleted without any user feedback:

1. Short file names containing lower case characters. These are converted to FAT all-uppercase file names. If there is not a long file name in the NTFS file system, a FAT long file name is also created with the lowercase or mixed case file name.
2. NTFS volume labels that contain more than eleven characters or that contain characters not in the FAT code page. Volume labels are truncated to eleven characters and made into uppercase. Any characters which are not represented in the FAT code page are replaced by a predetermined character, e.g., by an underscore.

In one embodiment, the following NTFS features are deleted only if the user agrees to the deletion in response to a message:

1. NTFS view and fast file finder indexes (Windows 2000 only).
2. NTFS named data streams. The data from these streams is deleted. In an alternate approach, the implementation creates a unique file name and saves the data in a FAT file.
3. Files with multiple versions. Only the most recent version is converted to a FAT file; the older versions are deleted. As with named data streams, an alternate approach creates a unique file name and saves the data from the older versions in one or more FAT files.
4. File types that have no equivalent in FAT file systems. Some examples are symbolic links, reparse points, Extended Attribute information, property sets, and logged utility streams.
5. An access control list denying some users access to a file. Access will be to all users if the file system is converted to FAT.
6. NTFS user storage quotas. After conversion, all users can use all the free space on the file system.

In one embodiment, the following NTFS features prevent conversion to FAT; in alternate embodiments, steps are taken as described to permit the conversion:

1. NTFS-style compressed files. In an alternate embodiment, these are uncompressed during the conversion, if the file system has enough free space.
2. NTFS-style sparse files. In an alternate embodiment, if the unallocated space is small, the embodiment allocates the needed space and fills it with zeros during the conversion. However, in many cases, the virtual size of sparse files is many times larger than the file system.
3. Files with more than one short name and one long name, both in the same directory. NTFS allows UNIX-style hard links, but FAT has no equivalent feature. In an alternate embodiment, if there is sufficient free space on the file system, the file's contents are copied and a second FAT directory entry is created with the extra name. This new entry points to the copy of the file data.
4. 64 k byte clusters. FAT-32 does not support them and FAT-16 does only with special device drivers, e.g., certain drivers available with Microsoft Windows NT releases 3.51 and 4.0. However, cluster resizing tools and techniques are discussed U.S. Pat. Nos. 5,675,769, 5,706,472, and 5,930,831, and in U.S. patent application Ser. No. 08/932,530. One approach resizes the NTFS clusters to a smaller size and then converts that file system to a FAT file system.
5. Any file on the NTFS file system has more than 4 Gb data. FAT files have a 32-bit length in bytes and cannot be larger than 4 Gb in size. A user may give permission to split the file into two or more smaller files, so the file system conversion can proceed, but such large files are sometimes used precisely because the user wants all of the data in a single file.

In one embodiment, the error/warning messages provided to users by the feature handling code 618 include those listed below. The "%lu" characters are placeholders for file identifiers. As noted, a given embodiment may treat a given feature as an error that prevents conversion, as an occasion to seek user permission to proceed. It may also proceed to produce a FAT file system by omitting the NTFS feature in question without seeking user permission.

1680 Extended index is present, File %lu

1681 Data is compressed or sparse, File %lu (%lu)

1682 File attribute cannot be converted to FAT, File %lu (%lu)

1683 File system is too small to convert to FAT-32

1684 File system is too large to convert to FAT

1685 Multiple long names or links, File %lu

1686 Multiple data streams, File %lu

1687 An object index is present, File %lu

1688 A text index is present, File %lu

1689 File %lu has multiple versions. Only newest will be retained.

1690 File %lu has an ACL. Access will be unrestricted after conversion

1691 Free space of %lu clusters less than %lu clusters needed to convert

1692 A file in directory %lu is larger than 4 Gb

1693 Partitions with 64 k clusters cannot be converted to FAT

1694 Bad clusters found at beginning of partition

Many of these errors are self-explanatory and/or are discussed elsewhere herein. As to the message that the "file system is too small to convert", the implementation in question performs conversion to FAT-12 or FAT-16 by first converting NTFS to FAT-32 and then converting FAT-32 to FAT-12 or FAT-16 (depending on partition size; FAT-12 is used mainly for floppy disks). If the selected partition is less than the approximate minimum size of a corresponding FAT-32 partition, then conversion would apparently waste disk space and thus is not performed by this implementation.

Options for handling advanced file system features during file system conversion are summarized below. Unless indicated otherwise, a given implementation may take conversion steps for handling a given feature with or without warning the user, and with or without first obtaining user permission. That is, the use made of warnings and user permissions depends on the implementation.

| Feature | Illustrative Options for Handling During Conversion |
|---|---|
| file attribute indexing | Delete index. No corresponding FAT feature. |
| multiple data streams per file | Delete all streams except the unnamed stream. Alternately, create a new file in the FAT system to contain each stream (one stream per FAT file). |
| system structures stored in files rather than in dedicated system area | Create corresponding FAT structures in dedicated FAT system area at the start of the partition. |
| log file for recoverability transactions for recoverability | Delete log. No corresponding FAT feature. Delete transactions. No corresponding FAT feature. |
| support for large disks | Create FAT-32 file system. |
| security descriptors constraining file access (access control lists) | Delete ACLs. No corresponding FAT feature. |
| Unicode names | Convert to names supported by FAT. |
| long file names | Convert to names supported by FAT. |
| POSIX/symbolic links | Delete symbolic links. No corresponding FAT feature. Alternately, copy file contents and create directory entries for each link. |
| bad cluster remapping | Bad clusters which are identified in the NTFS bad cluster file are identified as bad clusters in the file allocation table. The space used by the bad cluster file (like other system files) is treated as free space under FAT. |
| caching support | Caching is an operating system function, not part of the file system, for purposes of the present invention. |
| virtual memory support | Virtual memory is an operating system function, not part of the file system, for purposes of the present invention. |
| user data compressed by NTFS drivers | Disallow conversion. In an alternate embodiment, uncompress the data into free space. |
| balanced tree directory structures | Create corresponding FAT structures in dedicated FAT system area at the start of the partition. |
| volume spanning, volume sets, stripe sets, mirror sets, etc. | This is an operating system feature, not a file system feature, for purposes of the present invention. |
| relocatable system area | No corresponding FAT feature; FAT system area is not relocatable. However, this does not prevent conversion. Note that NTFS file system structures from the selected file system are deleted after conversion, since they are treated as free space in FAT. |
| sparse files | If space is available, convert to non-sparse format and store as non-sparse file. No corresponding FAT feature. |
| file system too large to convert | Don't do conversion. FAT-32 has a smaller maximum size than NTFS, for a given cluster size |
| file too large (over 4 gigabytes) | Split file/truncate file only with user permission. If largest file size cannot be reduced below over 4 gigabytes, conversion does not proceed. |
| multiple file versions | Delete all but most recent version. Alternately, create a new file in the FAT system to contain each version (one version per FAT file). |
| bad clusters found at beginning of partition | May relocate beginning of partition. Otherwise, no conversion. |
| Cluster size too large (64K) | Resize to smaller clusters. Alternately, convert to FAT-16. |
| Not enough free space to create FAT structures | Resize to larger partition and/or delete files from partition. |
| reparse point | Delete feature; no corresponding FAT feature. |
| Extended Attributes | Delete feature; no corresponding FAT feature. |
| property sets | Delete feature; no corresponding FAT feature. |
| logged utility streams | Delete feature; no corresponding FAT feature. |
| storage quota | Delete feature; no corresponding FAT feature. |

Conversion Module User Interface Code

A piece of user interface code 620 displays options and status (including, e.g., any error/warning messages); obtains user commands, preferences, and selections; provides assistance in the form of help files or wizards, and otherwise facilitates use of the invention. As noted, the user interface 620 may permit remote control of the main routine 616 over a computer network. Familiar user interface tools and techniques may be used.

Conversion Module Bootability Code

A piece of bootability code 622 maintains computer 602 in a bootable state. The partition table 200 is updated 414 to make the system indicator 310 indicate the type of FAT file system created, rather than indicating an NTFS system. If an NTFS file system is converted to a FAT-32 file system, the bootability code 622 puts 414 a Windows 2000 boot sector on the FAT-32 partition. If an NTFS file system is converted to a FAT-16 file system, the bootability code 622 puts 414 a Windows NT 4 boot sector on the file system. An alternate embodiment detects the operating system on an NTFS file system during a conversion to FAT-16 and puts 414 either a Windows NT 4.0 boot sector or a Windows 2000 boot sector on the FAT-16 file system.

Conversion Module File System Structure Code

A piece of file system structure code 624 creates FAT file system structures and populates them with data values corresponding to the NTFS file system structures. As noted, both FAT file system structures and NTFS file system structures are well known, but the structure and use of a correspondence between them for purposes of converting from NTFS to FAT, as described above in connection with the feature handling code 618 and elsewhere herein, is believed to be novel. Familiar tools and techniques for disk I/O, construction of data structures in memory, copying values from a data structure of one type to a data structure of another type, and other general aspects of computer programming may be used.

For safety and error handling, use of the invention may result in the simultaneous but normally temporary presence on the storage medium 608 of two valid file systems, such as coexisting NTFS and FAT file system structures. The NTFS directories and other system structures are treated as free space by the FAT file system and the FAT directories and other system structures are treated as free space by the NTFS file system. The operating system connects a device driver to a file system when it mounts the file system. The operating system determines which driver to use by examining the first sector of the file system. Therefore, from the operating system's point of view, the file system actually changes from NTFS to FAT when the boot sector is changed by step 414.

If the target file system is FAT-16, the area vacated 406 at the beginning of the partition included space for a fixed-position root directory, as required by FAT-16. If the target file system is FAT-32, the root directory does not occupy a fixed position and no special place is preallocated. If the source file system has a volume label, this label is converted and a FAT root directory entry is created with the volume label; FAT stores the volume label as an entry in the root directory.

The module 614 then creates an empty FAT in the computer's memory and at the beginning of the partition. The code 624 descends the directory tree in the source file system, reading each directory entry. For each directory entry that will be converted, an entry is added in a FAT directory structure that is being constructed in the free space of the source partition. The dates and FAT-style file attributes are converted to FAT directory format and added to the entry. Note that FAT dates are stored in the local time zone while dates in most advanced file systems are stored in Universal Coordinated Time, so time zone information gotten from the computer or from the user may be required for an accurate conversion of the dates. Also, many advanced file systems store more than a single date for each file. If this is the case, only the last-modified date is converted and put into the FAT directory entry. If the file's data is not stored in the directory entry, the chains of clusters allocated to the file described by the source directory entry are added to the FAT. If the file's data is stored in the directory entry, one or more clusters of free space are allocated and the data is copied from the directory entry to the free space. The clusters allocated are recorded in the FAT directory and in the FAT. As this occurs, the source file system is entirely intact; the FAT(s) and FAT directory appear as free space to the source (e.g., NTFS) file system. If the operation 400 is aborted at this stage, the source file system is still usable.

After the FAT structures and directories are built, the FAT may be copied to one or more backup FATs at the beginning of the file system, if backup FATs are enabled. As a last step, the FAT file system boot sector is written 414. At this point, the file system becomes a working FAT file system. The space in the source file system used by system structures, extra data streams (if not converted to FAT files) and other unconverted features of the source file system appears as free space in the FAT file system, since FAT chains were only created for those data streams that were given FAT directory entries. Thus, if the original boot record were to be restored 416 at this point, the source file system would still be intact, since none of its structure has been changed.

Full support for large disks may require the use of sixty-four bit variables to hold sector numbers. Although shorter variables (such as thirty-two bit variables) may be used with many partitions on many systems 600, the larger variables are preferred. Similar considerations apply to variables that hold cluster numbers and file descriptors.

Conversion Module Data Movement Code

A piece of data movement code 626, also referred to as vacating code, moves NTFS file content from an initial position in the selected partition to a different position in the converted partition if that user data would otherwise overlap the FAT boot record or a file allocation table(s), for instance, in the converted partition. This may be accomplished by vacating clusters with a function such as the Vacate( ) function described below.

If multiple data streams are allowed, each file must be checked for them. Thus, the software may contain an outer loop that steps through the files, with an inner loop that steps through the data, replicating or vacating the data streams. The MFT and other system structures are treated in many ways as if they were simply user files, at least as far as moving their constituent sectors is concerned. The log file and the security descriptors, for instance, are replicated and/or vacated just like user data. Files compressed by user applications, such as ZIP files, are preferably not decompressed, but merely treated as bit streams.

A RUN_REMAP_ENTRY structure tracks information about a run of clusters in a file. A run is a group of one or more contiguous clusters in a file. The structure includes a pointer or index to the next entry in a list or array of such structures, a file identifier such as a file number, an attribute type indicator, an attribute name CRC, a count indicating the number of clusters in the run, a virtual cluster number indicating the position of the run in the file, a logical cluster number specifying the current beginning of the run, and a target logical cluster number specifying the new beginning location for the run. The CRC (cyclic redundancy code) saves memory by storing a representation of an NTFS named data stream as a four-byte longword instead of using the Unicode name, which can be up to 510 bytes long. In alternative embodiments, the stream name may be used instead of the CRC.

A RUN_REMAP class contains data and member functions for remapping runs. The class data includes a map rrMap in the form of an array of RUN_REMAP_ENTRY structures and an indication of the array's size, a Boolean indicating whether cluster numbers are wrapping around to positions before a point one-eighth into the partition, a delta specifying the range of canonical locations for system files, a count indicating the number of free clusters available for temporary use during a cluster remapping operation, a logical cluster number specifying the cluster one-eighth of the way into the partition from the left (typically the lowest sector address) edge, a logical cluster number specifying the first cluster after the Master File Table, and a logical cluster number specifying the target beginning position during remapping.

The RUN_REMAP class functions include inline function RUN_REMAP( ) for allocating and initializing (rerun map size zeroed, wrapping false), void SetFirstFree(SLCN slcnNewFirstFree) for setting the first cluster after the Master File Table, void SetStart(SLCN slcnNewStart) for setting the cluster at the one-eighth point, void SetRemapAddr (SLCN slcnNewAddr) for setting the target cluster and setting wrapping false, void SetDelta(ULONG ulNewDelta) for setting the system file remap position delta, void SetFreeClusts(ULONG ulNewFreeClusts) for setting the number of free clusters, ULONG GetMapSize(void) for returning the map size, SLCN GetRemapAddr(void) for returning the target logical cluster number, and RUN_REMAP_ENTRY *GetMapEntry(int n) for returning a specified map entry.

The RUN_REMAP class also includes these functions: MapRun( ) for mapping a run, RemapRuns( ) for remapping an attribute's runs, ReRemapRun( ) for re-remapping a run, AddMapping( ) for adding a mapping, RemapAttrByHeader( ) for remapping a file attribute using an attribute record header, RemapAttrByEntry( ) for remapping a file attribute using an attribute list entry, RemapSysAttr( ) for remapping a system attribute, and Vacate( ) for vacating clusters from an area on disk without losing user data. These functions are described in greater detail below.

The MapRun( ) function for mapping a run takes the following parameters: a pointer to an object that contains file attribute data and member functions, a virtual cluster number specifying the run's position in the file, a logical cluster number specifying the run's position on disk, a cluster count specifying the run's length, and an index into rrMap specifying the insertion point if it is not at one end. For each cluster in the run, the function first determines whether the run is in a forbidden region. Regions may be forbidden because they contain bad sectors, or they may be temporarily forbidden to reserve them for system files. If the beginning of the run is in a forbidden region, then the target address is moved to just after the run. When the right edge of the partition is reached, one run may be wrapped once back to the beginning of the partition; if further attempts are made to wrap a run, the function returns an error code indicating the partition is full. If part of the run after the beginning is in a forbidden region, as many clusters will be mapped as possible. The presence of unmerged adjacent forbidden regions is treated as an error. Individual runs are mapped using the AddMapping( ) function described herein.

NTFS may allocate bad clusters to the bad cluster file in a sparse file format when those clusters are identified as bad during an initial FORMAT invocation. The sparse file format recalls the sparse file approach used in UNIX and POSIX systems. Bad sectors may also be found during ordinary use of the file system when an attempt is made to access data. Bad clusters are added to the bad cluster file in a sparse file format.

The RemapRuns( ) function for remapping an attribute's runs takes as a parameter a pointer to an object that contains file attribute data and member functions. If the attribute is resident, the function simply returns a success code. Otherwise, for each run in the attribute the function maps the run using the MapRun( ) function described herein.

The ReRemapRun( ) function is used for re-remapping a run in an attribute after the MoveRun( ) or MoveRun2( ) function is called. The ReRemapRun( ) function parameters are a pointer to an object that contains file attribute data and member functions (the attribute to remap), and an index into rrMap. The function saves the target logical cluster number specified in rrMap at the indexed location and deletes the entry being remapped. For each cluster in the entry, the function used the AddMapping( ) function to add the cluster to the map.

The AddMapping( ) function for adding a mapping takes the following parameters: a file number, an attribute type, an attribute CRC, a cluster count, a virtual cluster number specifying a run's position in the file, logical cluster numbers specifying the current and target positions of the run, and an index or pointer into an array or list of mappings specifying the insertion point if it is not at one end of the array or list. The function adds the mapping, making room in the array or list at the indicated position if necessary.

The RemapAttrByHeader( ) function for remapping a file attribute using an attribute record header takes as parameters a pointer to an object containing information about a file record segment containing the attribute and a pointer to an object containing attribute record header information. The header information is used to open the attribute. If the attribute is nonresident, the function invokes the RemapRuns( ) function on the attribute and then closes the attribute.

The RemapAttrByEntry( ) function for remapping a file attribute using an attribute list entry takes as parameters a pointer to an object containing information about a file record segment containing the attribute and a pointer to an object containing attribute list entry information. The list entry information is used to open the attribute. If the attribute is nonresident, the function invokes the RemapRuns( ) function on the attribute and then closes the attribute.

The RemapSysAttr( ) function for remapping a system attribute takes the following parameters: a pointer to an object containing information about the volume containing the attribute, the file number of the attribute, the attribute type, the attribute name, and a Boolean indicating whether to remap or to suppress remapping. If remapping is suppressed, the function merely puts an entry in the mapping table rrMap. If the runs in an attribute are not within a few clusters of the insert point or the runs are not contiguous, then the function enters a remap operation for the runs. More precisely, the function starts by opening the file record segment and the attribute. If the attribute is resident, the file record segment and the attribute are closed and the function returns. Otherwise, if remapping is suppressed then an entry is made by calling AddMapping( ) for each run in the attribute. If remapping is not suppressed then RemapRuns( ) is called. In either case, the function ends by closing the file record segment and the attribute.

To illustrate the Vacate( ) function and simultaneously provide a sample of error detection and handling, typing, and other implementation details, one embodiment of the Vacate( ) function is provided below.

```
//----------------------------------------------------------------------
// Move clusters out of a given region.
//----------------------------------------------------------------------
PQRET RUN_REMAP::Vacate(
        NTFS_VOLUME *pVol,              // Volume
```

```
        SLCN slcnBegin,                      // Area being vacated
        ULONG ulCount)
{
        PQRET pqRet;
        PQRET pqRet2;
        NTFS_FRS *pFrs = NULL;                // An FRS (file record segment)
        NTFS_ATTRIBUTE *pAttr = NULL;         // An attribute (data stream)
        RUN_REMAP_ENTRY *pEntry;              // Ptr. to a run to remap
        RUN_LIST*pFRun;                       // Ptr. to RUN_LIST version of run
        RUN *pRun;                            // Argument to MoveRun()
        STATE_MAP *pBitmap;                   // Pointer to current bitmap
        SLCN slcnEnd;                         // End of vacate area
        SLCN slcnRunEnd;                      // End of current run
        ULONG ulType;                         // The type of the *pNthAttr
        ULONG ulNameCrc;                      // The name CRC of the *pNthAttr
        UINT i;                               // Misc. loop counter
        BOOL bNew;                            // TRUE if this is the first time
        BOOL bFrsDirty;                       // TRUE if an FRS has changed
        BOOL bAttrDirty;                      // TRUE if an attribute has changed
        pFRun = pVol—>AddForbiddenRegion(slcnBegin, ulCount);
        pBitmap = pVol—>GetBitmap();
        ulType = 0;
        bFrsDirty = FALSE;
        bAttrDirty = FALSE;
        bNew = TRUE;
        slcnEnd = slcnBegin + ulCount;
        for(   i = 0;
               i < GetMapSize() && pBitmap—>GetNextSet(slcnBegin) < slcnEnd;
               i++) {
               pEntry = &rrMap[i];
               slcnRunEnd = pEntry—>Begin + pEntry—>Count;
               if (pEntry—>Begin <= slcnBegin && slcnRunEnd > slcnBegin ||
                       pEntry—>Begin < slcnEnd && slcnRunEnd >= slcnEnd ||
                       slcnBegin <= pEntry—>Begin && slcnEnd > pEntry—>Begin) {
                       // this run must be vacated
                       if (bNew || pEntry—>FileNo != pFrs—>GetSegmentNum()) {
                               if (bFrsDirty) {
                                       pqRet = pFrs—>Write();
                                       if (pqRet != PQ_OK) goto Exit;
                               }
                               if (pFrs != NULL) {
                                       pqRet = pFrs—>CloseAttribute(&pAttr);
                                       if (pqRet != PQ_OK) goto Exit;
                               }
                               pqRet = pVol—>CloseFrs(&pFrs);
                               if (pqRet != PQ_OK) goto Exit;
                               pqRet = pVol—>OpenFrs(   pEntry—>FileNo,
                                                        NTFS_FRS_READ_USED,
                                                        &pFrs);
                               if (pqRet != PQ_OK) goto Exit;
                               bNew = TRUE;
                       }
                       if(    bNew ||
                              pEntry—>Type != ulType ||
                              pEntry—>NameCrc != ulNameCrc) {
                              pqRet = pFrs—>CloseAttribute(&pAttr);
                              if (pqRet != PQ_OK) goto Exit;
                              pqRet = pFrs—>OpenAttributeByNameCrc(
                                                        pEntry—>Type,
                                                        pEntry—>NameCrc,
                                                        &pAttr);
                              if (pqRet != PQ_OK) goto Exit;
                              ulType = pEntry—>Type;
                              ulNameCrc = pEntry—>NameCrc;
                              bNew = FALSE;
                       }
                       pqRet = pAttr—>GetRun(    pEntry—>Pos,
                                                 NULL,
                                                 NULL,
                                                 NULL,
                                                 NULL,
                                                 &pRun);
                       if (pqRet != PQ_OK) goto Exit;
                       if (pRun—>slcnBegin < pEntry—>Begin) {
                               // get rid of beginning of run
                               pqRet = pAttr—>SplitRun(
                                                 pRun,
                                                 pEntry—>Begin − pRun—>slcnBegin);
                               pRun = pRun—>next;      // use second portion
```

```
                    if (pqRet != PQ_OK) goto Exit;
                    if (pRun—>ulClusts == 0) continue;
                }
                if (pRun—>ulClusts > pEntry—>Count) {
                    // get rid of extra part of run
                    pqRet = pAttr—>SplitRun(pRun, pEntry—>Count);
                    if (pqRet != PQ_OK) goto Exit;
                }
                pqRet = pAttr—>MoveRun(pRun, 0); // move the run in question
                if (pqRet != PQ_OK) goto Exit;
                // Reload the remaining run list entries for this attribute.
                pqRet = ReRemapRun(pAttr, i);
                if (pqRet != PQ_OK) goto Exit;
                bFrsDirty = TRUE;
            } // end if (run must move)
        } // end for
        pVol—>RemoveForbiddenRegion(pFRun);
        if (bFrsDirty) {
            pqRet = pFrs—>Write();
            if (pqRet != PQ_OK) goto Exit;
        }
Exit:
        if (pqRet == PQ_OK && pBitmap—>GetNextSet(slcnBegin) < slcnEnd)
            pqRet = ERR_MOVE_INCOMPLETE;
        if (pFrs != NULL) {
            pqRet2 = pFrs—>CloseAttribute(&pAttr);
            if (pqRet == PQ_OK) pqRet = pqRet2;
        }
        pqRet2 = pVol—>CloseFrs(&pFrs);
        if (pqRet == PQ_OK) pqRet = pqRet2;
        return (pqRet);
} // end RUN_REMAP::Vacate()
```

Conversion Module Storage Calculation Code

A piece of storage calculation code 628 calculates storage requirements for the disk space needed to perform the conversion. One embodiment pre-calculates the sizes of each FAT directory and tests for enough free space. It also stores the size values. During the conversion, the code 628 preallocates the entire space for each directory at the beginning of the directory. This avoids the fragmentation caused when a subdirectory is encountered and the parent will need more space after the subdirectory; in that case, the subdirectory's space is in the middle of the parent's space. By contrast, with at least one embodiment of the invention, the parent will be contiguous if enough contiguous space is available when the preallocation is done.

In NTFS, since the directory data is so big (usually 1 k bytes per file), files with small amounts of data store their data in the directory area. The code 628 performs a free space check which checks for these types of files and calculates the free space needed to copy the data from the directory area to one or more new clusters. Because of this, the conversion can fail before any changes are made on the drive if there is too little free space. This is often preferable to running out of space at some point further into the conversion.

The disk allocation code 628 checks for storage-related conditions that normally prevent conversion to FAT. For instance, after determining the space needed to hold the FAT system structures, the code 628 may detect that the storage medium 608 and/or the selected partition lack sufficient free space to create the FAT structures. Likewise, the code 628 may determine that the selected partition is too small to hold the two file allocation tables and the boot sector. In connection with a desired conversion to FAT-16, the code 628 may determine that conversion is barred because the content of the resulting file system would be greater than two gigabytes in size. Such conditions are not absolute bars to conversion, if the necessary space can be obtained by having the user delete files and/or by resizing the selected partition to make it larger. The file conversion aspects of the present invention may be combined with familiar tools and techniques for file management and/or familiar tools and techniques for partition manipulation by resizing partitions and/or resizing clusters.

Configured Media

The computer 602 is capable of using one or more floppy drives, tape drives, optical drives and/or other means to read a storage medium. A suitable storage medium includes a magnetic, optical, or other computer-readable storage device having a specific physical substrate configuration. Suitable storage devices include floppy disks, hard disks, tape, CD-ROMs, DVDs, PROMs, RAM, flash memory and other computer system storage devices. The substrate configuration represents data and instructions which cause the computer system to operate in a specific and predefined manner as described herein. Thus, the medium tangibly embodies a program, functions, and/or instructions that are executable by the standalone machines, servers and/or network client computers to perform file system conversion steps of the present invention.

Linux Ext2File System

The Linux operating system works with an advanced file system known, for instance, as the "ext2 file system", "ext2fs", or "Ext-2". The invention may be used in a manner similar to that discussed above with NTFS, in order to convert from ext2fs to FAT file systems. However, certain differences should be noted.

For instance, the Ext-2 file system does not have a boot record. The first cluster is unused by the file system and is intended for use by a third-party boot program. If the selected source partition was a bootable partition, then the conversion program 614 may have to analyze the first cluster to determine the effect of the boot process, and provide 414 a boot record in the FAT partition to accomplish the same thing.

Also, the Ext-2 file system stores cluster use bitmaps and superblocks at fixed locations on the partition. If any of these locations is within the area at the beginning that will be vacated 406 for the FAT system structures, then the ext2 file system will not be intact after the FAT is built. However, the ext2 bitmap may be stored elsewhere (e.g., on a removable medium or in another partition), so it can be restored if an error is encountered before the conversion is complete.

CONCLUSION

In summary, the present invention provides a system and method for efficient, correct, and safe conversion from NTFS, ext2fs, and other advanced file systems to FAT file systems. Software embodying the present invention recognizes advanced file system features such as multiple data streams, symbolic links, storage quotas, and access control lists, and treats them in ways that preserve the internal consistency and integrity of system data to the extent correspondences are defined during the file system conversion. User permissions may be sought, or default approaches may be used to handle advanced file system features. Conversion may be accomplished without unnecessary movement of user data. At least one set of functional file system structures may be kept on the disk at all times, and the conversion may be reversed in many cases simply by making sure an appropriate boot sector is put in place.

Although particular methods and systems embodying the present invention are expressly illustrated and described herein, it will be appreciated that signal and article embodiments may be formed according to the systems and methods of the present invention. Unless otherwise expressly indicted, the description herein of methods and systems of the present invention therefore extends to corresponding signals and articles, and the description of signals and articles of the present invention extends likewise to corresponding methods and systems.

The invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for converting an advanced file system to a simpler file system in-place while preserving user data, the method comprising the steps of:
    checking for sufficient space to hold file system structures of the simpler file system;
    creating file system structures of the simpler file system using data values from file system structures of the advanced file system; and
    updating file system identification information to identify the simpler file system to an operating system rather than identifying the advanced file system to the operating system.

2. The method of claim 1, wherein the creating step creates file system structures of-the simpler file system in part of a partitionable storage medium that is treated by the advanced file system as free space.

3. The method of claim 1, wherein the method further comprises vacating space, and the creating step creates file system structures of the simpler file system at least partially in such vacated space.

4. The method of claim 1, wherein the method comprises deleting at least one advanced file system feature without user permission, such that the simpler file system produced by the method lacks a feature corresponding to the deleted feature.

5. The method of claim 1, wherein the method comprises deleting at least one advanced file system feature after obtaining user permission, such that the simpler file system produced by the method lacks a feature corresponding to the deleted feature.

6. The method of claim 1, wherein the advanced file system includes a file that has a short file name and lacks a long file name, and the method comprises creating a FAT long file name corresponding to the short file name.

7. The method of claim 1, wherein the advanced file system includes a first volume label that contains more than eleven characters, and the method comprises creating from the first volume label a FAT volume label of no more than eleven characters.

8. The method of claim 1, wherein the advanced file system includes at least one NTFS index, and the method comprises deleting that index such that no corresponding index appears in a FAT file system produced by the method.

9. The method of claim 1, wherein the advanced file system includes at least one NTFS named data stream, and the method comprises deleting that named data stream such that no corresponding data appears in a FAT file system produced by the method.

10. The method of claim 1, wherein the advanced file system includes at least one NTFS named data stream, and the method comprises saving the data of that named data stream so it appears in a file in a FAT file system produced by the method.

11. The method of claim 1, wherein the advanced file system includes at least one NTFS file having two or more versions, and the method comprises deleting all but one of the versions so that only one version appears in a FAT file system produced by the method.

12. The method of claim 1, wherein the advanced file system includes at least one NTFS file having two or more versions, and the method comprises saving the data from each of at least two of the versions so that each version's data appears in a FAT file system produced by the method.

13. The method of claim 1, wherein the advanced file system includes at least one access control list restricting access to a file, and the method comprises deleting that access control list such that no corresponding access restrictions appear in a FAT file system produced by the method.

14. The method of claim 1, wherein the advanced file system includes at least one NTFS user storage quota for a file, and the method comprises deleting that storage quota such that no corresponding storage restriction appears in a FAT file system produced by the method.

15. A computer storage medium having a configuration that represents data and instructions which will cause performance of the method steps in claim 1.

16. A method for at least attempting conversion of an advanced file system to a simpler file system, the method comprising the steps of:
    checking for at least one preventive condition in the advanced file system that prevents an implementing program from completing a file system conversion from the advanced file system to the simpler file system;
    discontinuing an attempted file system conversion by the implementing program without completing the file system conversion if such a preventive condition is found; and
    completing the file system conversion if no such preventive condition is found, wherein completing the conversion comprises creating file system structures of the simpler file system using data values from file system structures of the advanced file system and updating file system identification information to identify the simpler file system to an operating system rather than identifying the advanced file system to the operating system.

17. The method of claim 16, wherein the condition checking step checks for the following preventive condition: a lack of sufficient space to hold file system structures of the simpler file system.

18. The method of claim 16, wherein the condition checking step checks for the following preventive condition: files compressed by a file system driver.

19. The method of claim 16, wherein the condition checking step checks for the following preventive condition: sparse files.

20. The method of claim 16, wherein the condition checking step checks for the following preventive condition: a file with more than one short name and one long name, both in the same directory.

21. The method of claim 16, wherein the condition checking step checks for the following preventive condition: clusters which are at least sixty-four kilobytes in size.

22. The method of claim 16, wherein the condition checking step checks for the following preventive condition: a file which is larger than four gigabytes in size.

23. The method of claim 16, wherein the condition checking step checks for the following preventive condition: a bad cluster at a location that would be used by a file system structure of the simpler file system.

24. A computer storage medium having a configuration that represents data and instructions which will cause performance of the method steps in claim 16.

25. A system comprising:
at least one computer having a processor in operable connection with a memory;
a partitionable storage medium having at least one partition, the partition identified by file system identification information and containing an advanced file system, the advanced file system accessible for manipulation by use of the processor;
wherein the system is configured to perform a method to at least attempt conversion of an advanced file system to a simpler file system, the method including the steps of:
checking for at least one preventive condition in the advanced file system that prevents completion of a file system conversion from the advanced file system to the simpler file system;
discontinuing an attempted file system conversion without completing it if such a preventive condition is found; and
completing the file system conversion if no such preventive condition is found.

26. The system of claim 25, configured so the creating step at least partially overwrites a file system structure of the advanced file system with a file system structure of the simpler file system.

27. The system of claim 25, configured so the method further comprises vacating space, and the creating step creates file system structures of the simpler file system at least partially in such vacated space.

28. The system of claim 25, wherein the advanced file system includes at least one NTFS index, and the method comprises deleting that index such that no corresponding index appears in a FAT file system produced by the method.

29. The system of claim 25, wherein the advanced file system includes at least one NTFS named data stream, and the method comprises at least one of: deleting a named data stream such that no corresponding data appears in a FAT file system on the system, and saving the data of a named data stream so it appears in a file in a FAT file system on the system.

30. The system of claim 25, wherein the advanced file system includes at least one NTFS file having two or more versions, and the method comprises at least one of: deleting at least one version's data such that no corresponding data appears in a FAT file system on the system, and saving the data from each of at least two of the versions so that each version's data appears in a FAT file system on the system.

31. The system of claim 25, wherein the file system identification information identifies an NTFS advanced file system.

32. The system of claim 25, wherein the file system identification information identifies an ext2fs advanced file system.

33. The system of claim 25, wherein the advanced file system includes at least one access control list restricting access to a file, and the method comprises deleting that access control list such that no corresponding access restrictions appear in a FAT file system produced by the method.

34. The system of claim 25, wherein the advanced file system includes at least one NTFS user storage quota for a file, and the method comprises deleting that storage quota such that no corresponding storage restriction appears in a FAT file system produced by the method.

35. The system of claim 25, wherein the condition checking step checks for at least one of the following preventive conditions:
a lack of sufficient space to hold file system structures of the simpler file system;
files compressed by a file system driver;
sparse files;
a file with more than one short name and one long name, both in the same directory;
clusters which are at least sixty-four kilobytes in size;
a file which is larger than four gigabytes in size;
a bad cluster at a location that would be used by a file system structure of the simpler file system.

36. The system of claim 25, wherein the condition checking step checks for at least two of the following preventive conditions:
a lack of sufficient space to hold file system structures of the simpler file system;
files compressed by a file system driver;
sparse files;
a file with more than one short name and one long name, both in the same directory;
clusters which are at least sixty-four kilobytes in size;
a file which is larger than four gigabytes in size;
a bad cluster at a location that would be used by a file system structure of the simpler file system.

37. The system of claim 25, wherein the condition checking step checks for at least three of the following preventive conditions:
a lack of sufficient space to hold file system structures of the simpler file system;
files compressed by a file system driver;
sparse files;
a file with more than one short name and one long name, both in the same directory;
clusters which are at least sixty-four kilobytes in size;

a file which is larger than four gigabytes in size;

a bad cluster at a location that would be used by a file system structure of the simpler file system.

38. The system of claim 25, wherein the system comprises:

at least two computers, each having at least a memory, a processor, and I/O devices, the computers being connected for communication between the computers;

a means for deleting at least one predetermined advanced file system feature from a selected partition on one of the computers without user feedback; and a means for deleting at least one other predetermined advanced file system feature from the selected partition after user feedback agreeing to the deletion.

* * * * *